United States Patent
Tamaizumi et al.

(10) Patent No.: US 9,718,492 B2
(45) Date of Patent: Aug. 1, 2017

(54) ELECTRIC POWER STEERING APPARATUS

(71) Applicant: JTEKT CORPORATION, Osaka-shi, Osaka (JP)

(72) Inventors: Terutaka Tamaizumi, Okazaki (JP); Hirozumi Eki, Okazaki (JP); Masayuki Kita, Okazaki (JP); Isao Namikawa, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 33 days.

(21) Appl. No.: 14/176,719

(22) Filed: Feb. 10, 2014

(65) Prior Publication Data

US 2014/0238768 A1    Aug. 28, 2014

(30) Foreign Application Priority Data

Feb. 27, 2013 (JP) .................................. 2013-037091

(51) Int. Cl.
*B62D 5/04*    (2006.01)
*B62D 6/04*    (2006.01)

(52) U.S. Cl.
CPC ......... *B62D 5/0463* (2013.01); *B62D 5/0469* (2013.01); *B62D 6/04* (2013.01)

(58) Field of Classification Search
CPC ...... B62D 5/0469; B62D 5/0463; B62D 6/00; B62D 15/025; B62D 6/04; B60W 10/20; B60W 2540/18
USPC .............................................. 701/40, 41, 42
See application file for complete search history.

(56) References Cited

U.S. PATENT DOCUMENTS

| 4,740,002 | A | * | 4/1988 | Miyoshi ..................... 180/415 |
| 6,176,341 | B1 | * | 1/2001 | Ansari ................. B62D 5/001 180/402 |
| 7,826,950 | B2 | | 11/2010 | Tamaizumi et al. |
| 2005/0269874 | A1 | * | 12/2005 | Ishimoto ..................... 303/146 |
| 2006/0015239 | A1 | * | 1/2006 | Higuchi ......................... 701/72 |
| 2007/0288143 | A1 | * | 12/2007 | Arima et al. ................... 701/41 |
| 2007/0288144 | A1 | * | 12/2007 | Arima et al. ................... 701/41 |
| 2008/0033613 | A1 | | 2/2008 | Tamaizumi et al. |
| 2008/0119986 | A1 | * | 5/2008 | Wei .................... B62D 15/0245 701/41 |
| 2008/0156572 | A1 | * | 7/2008 | Kasahara et al. ............. 180/402 |

(Continued)

FOREIGN PATENT DOCUMENTS

EP    2 708 445 A2    3/2014
JP    A-2003-312514    11/2003

(Continued)

OTHER PUBLICATIONS

Nov. 26, 2015 Search Report issued in European Patent Application No. 14155006.1.

(Continued)

*Primary Examiner* — Behrang Badii
*Assistant Examiner* — Daniel L Greene
(74) *Attorney, Agent, or Firm* — Oliff PLC (57) ABSTRACT

An end determination unit determines that a steering apparatus is in an end touching state when an angle deviation, which is a difference between an actual turning angle and a target turning angle, exceeds a threshold. This angle deviation exceeds the threshold before a large axial force is generated in a steering shaft. Accordingly, is it possible to determine that the steering apparatus is in the end touching state more quickly.

5 Claims, 5 Drawing Sheets

(56) References Cited

U.S. PATENT DOCUMENTS

| | | | |
|---|---|---|---|
| 2008/0185213 A1* | 8/2008 | Mori et al. | 180/402 |
| 2009/0114470 A1* | 5/2009 | Shimizu | B62D 1/16 |
| | | | 180/444 |
| 2011/0218704 A1 | 9/2011 | Kanekawa et al. | |
| 2013/0238196 A1* | 9/2013 | Seto | B62D 5/0469 |
| | | | 701/42 |
| 2013/0311044 A1 | 11/2013 | Tamaizumi et al. | |

FOREIGN PATENT DOCUMENTS

| | | |
|---|---|---|
| JP | A-2006-131191 | 5/2006 |
| JP | 2006-175940 A | 7/2006 |
| JP | 2008/143200 A | 6/2008 |
| JP | 2008/149872 A | 7/2008 |
| JP | A-2008-260421 | 10/2008 |
| JP | 2009/143312 A | 7/2009 |
| JP | 2011/183923 A | 9/2011 |
| WO | 2012/073426 A1 | 6/2012 |
| WO | 2012/133590 A1 | 10/2012 |

OTHER PUBLICATIONS

Aug. 16, 2016 Office Action issued in Japanese Application No. 2013-037091.

\* cited by examiner

ELECTRIC POWER STEERING APPARATUS

BACKGROUND OF THE INVENTION

The present invention relates to an electric power steering apparatus.

The electric power steering apparatus assists steering force through motor driving in order to realize an excellent steering feeling.

Specifically, the electric power steering apparatus disclosed in Japanese Laid-Open Patent Publication No. 2006-131191 has an assist torque calculating unit which calculates assist torque based on a vehicle speed and steering torque. The assist torque calculating unit increases the assist torque as the steering torque becomes larger. The assist torque calculating unit also decreases the assist torque as the vehicle speed V becomes faster. A steering assist force according to this calculated assist torque is applied to the steering shaft through the motor.

The range of movement of a steerable wheel is defined in a general vehicle. Specifically, a rack shaft is moved in an axial direction along with operation of the steering wheel, whereby the wheel is turned. The movement of this rack shaft is restricted by its end portion brought into an end touching state of touching against a rack housing. Thus, steering beyond the range of movement of the steering wheel is restricted.

Electric power steering apparatus disclosed in Japanese Laid-Open Patent Publication No. 2003-312514 and Japanese Laid-Open Patent Publication No. 2008-260421 determine the end touching state in the electric power steering apparatus if the steering torque exceeds a threshold due to the steering wheel being further steered to the end side from the end touching state. In this case, a process of suppressing heat generation in a circuit or an impact absorbing process such as suppressing the assist torque is carried out. The impact absorbing process suppresses a load applied to a steering shaft, particularly to an intermediate shaft accompanying the assist torque applied in the end touching state.

However, the electric power steering apparatus described in the above documents determine that the end touching state has been reached when the steering torque exceeds a threshold, that is, after an axial force more than a fixed value is generated in the rack shaft. Therefore, the suppression of the assist torque is carried out after a fixed load is applied to the intermediate shaft. In terms of suppressing the load applied to the intermediate shaft, in terms of suppressing the heat generation in the circuit, it has been demanded to more quickly make the determination of the end touching state.

SUMMARY OF THE INVENTION

The object of the present is to provide an electric power steering apparatus capable of making the determination to be in the end touching state more quickly.

In order to solve the above problem, there is provided an electric power steering apparatus with an electric power steering apparatus comprising a first control device configured to generate a first command value for providing assist torque to a steering system according to steering torque applied to a steering shaft through an operation of a steering wheel by a driver, a second control device configured to generate a second command value for determining a target turning angle depending on input torque that is at least either the assist torque or the steering torque and for controlling an actual turning angle of a vehicle to be the target turning angle, a steering force provider configured to provide assist torque to the steering system based on the first and second command values, and an end touch determination device configured to determine that an end touching state has been reached where an end portion of a rack shaft of the steering system touches against an end by the operation of the steering wheel, when an angle deviation between the actual turning angle and the target turning angle exceeds a threshold.

DETAILED DESCRIPTION OF THE PREFERRED EMBODIMENTS

An embodiment embodying an electric power steering apparatus according to the present invention will be described with reference to FIGS. 1 to 7.

Figure 1:
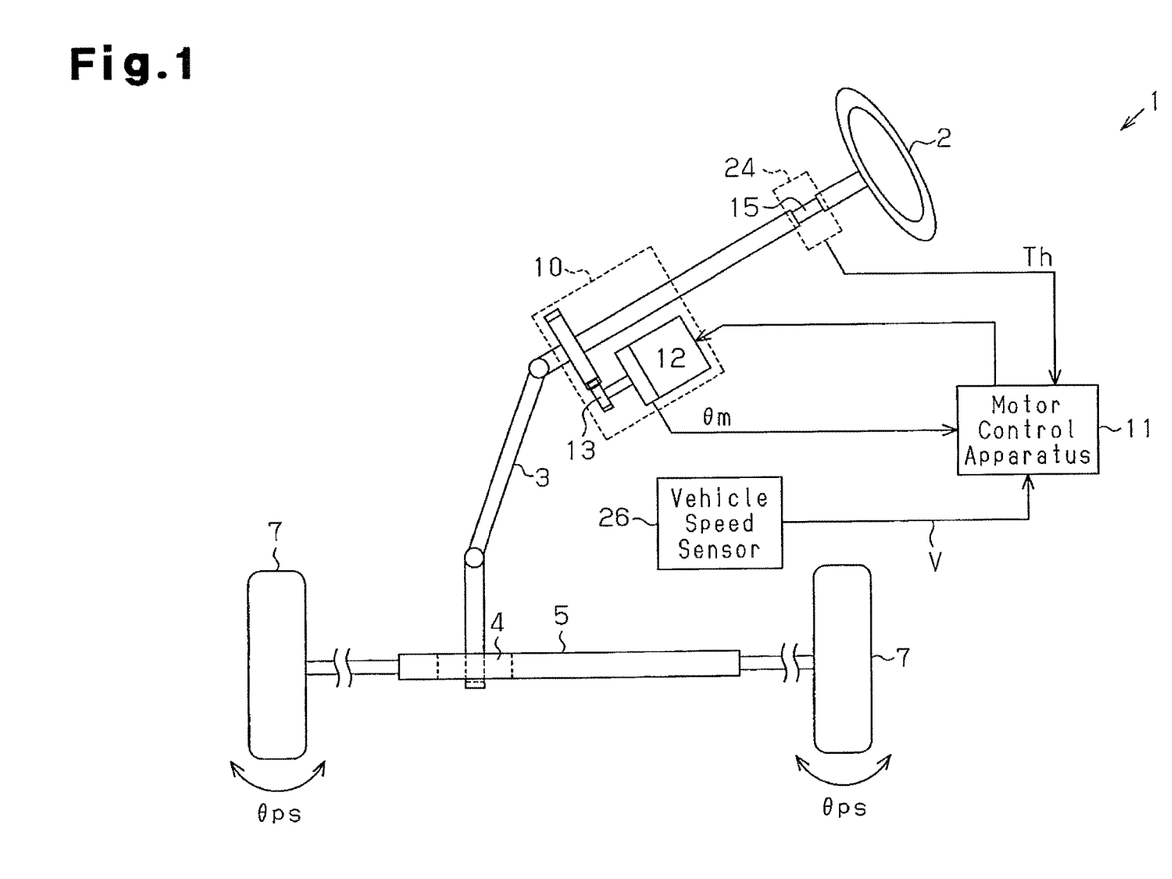
FIG. 1 is a block diagram showing a configuration of an electric power steering apparatus in an embodiment of the present invention.

As shown in FIG. 1, an electric power steering apparatus (EPS) 1 has a steering wheel 2 steered by a driver, a steering shaft 3 turned together with the steering wheel 2, and a rack shaft 5 coupled to the steering shaft 3 via a rack-and-pinion mechanism 4.

Upon operation of the steering wheel 2, the steering shaft 3 is rotated. The rotation of the steering shaft 3 is converted into reciprocating linear movement of the rack shaft 5 by the rack-and-pinion mechanism 4. By this reciprocating linear movement of the rack shaft 5, an actual turning angle θps of tires is changed.

The EPS 1 also has an EPS actuator 10 and a motor control apparatus 11 controlling the movement of the EPS actuator 10. The EPS actuator 10 provides a steering system with an assist force for assisting steering operation. The EPS actuator 10 has a motor 12 serving as a driving source, and a speed reduction mechanism 13. As the motor 12, a brushless motor is employed.

The driving force of the motor 12 is transmitted to the steering shaft 3 after speed reduction through the speed reduction mechanism 13. Thus, the assist torque is provided to the steering system such as the steering wheel 2, the steering shaft 3, etc.

The motor control apparatus 11 is connected to a vehicle speed sensor 26 and a torque sensor 24. The vehicle speed sensor 26 detects a vehicle speed V and outputs the detection result to the motor control apparatus 11. A torsion bar 15 is provided in the middle of the steering shaft 3. The torque sensor 24 detects a steering torque Th to be transmitted to the steering shaft 3 based on torsion of the torsion bar 15, and then outputs the detection result to the motor control apparatus 11.

Figure 2:
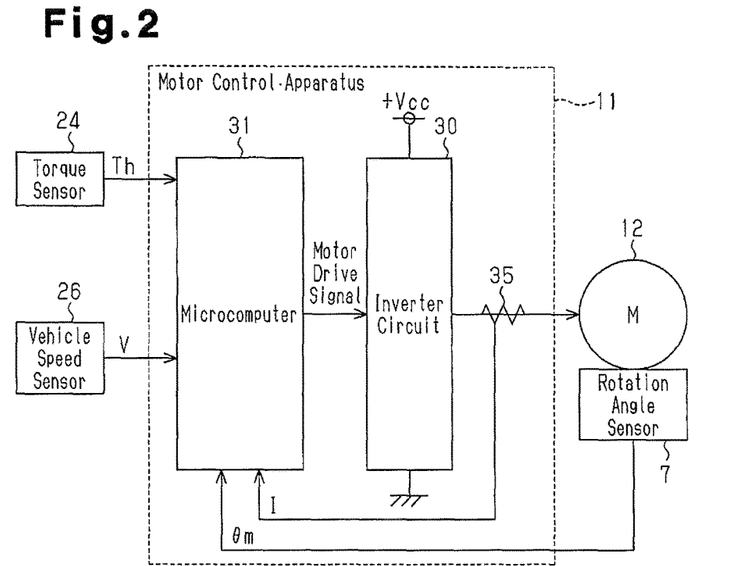
FIG. 2 is a block diagram showing a configuration of a motor control apparatus.

As shown in FIG. 2, the motor control apparatus 11 has a microcomputer 31 outputting a motor drive signal, and an inverter circuit 30 supplying the motor 12 with driving power based on the motor drive signal.

A current sensor 35 for detecting an actual current value I is provided between the inverter circuit 30 and the motor 12. Further, the motor 12 is provided with a rotation angle sensor 7 for detecting a motor rotation angle $\theta m$. The rotation angle sensor 7 outputs the detected motor rotation angle $\theta m$ to the microcomputer 31.

Figure 3:
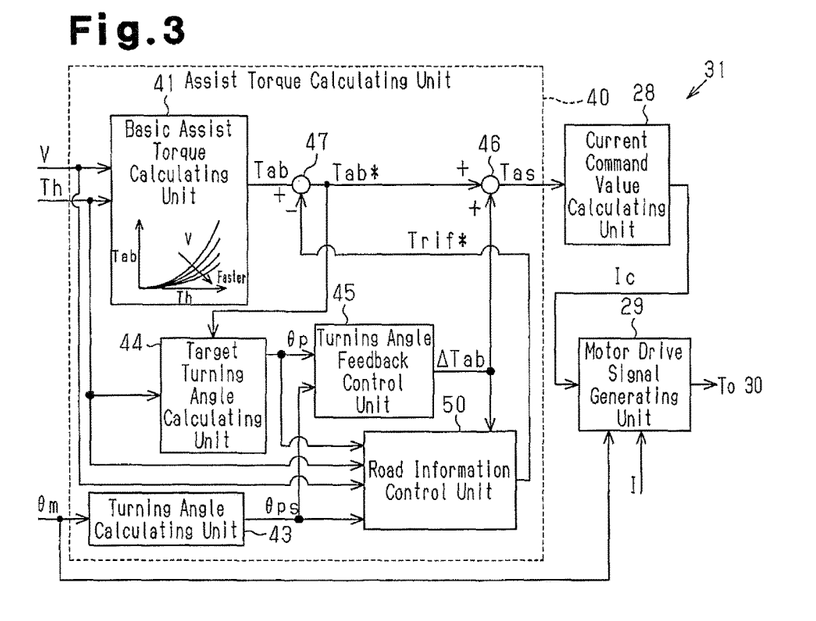
FIG. 3 is a block diagram showing a configuration of a microcomputer.

As shown in FIG. 3, the microcomputer 31 has an assist torque calculating unit 40, a current command value calculating unit 28, and a motor drive signal generating unit 29.

The assist torque calculating unit 40 calculates an assist torque command value Tas to be generated in the motor 12 based on the steering torque Th and the vehicle speed V, and then outputs the calculation result to the current command value calculating unit 28. The current command value calculating unit 28 calculates a current command value Ic corresponding to the assist torque command value Tas, and then outputs the calculation result to the motor drive signal generating unit 29.

The motor drive signal generating unit 29 generates a motor drive signal by executing current feedback control to have the actual current value I follow the current command value Ic. The inverter circuit 30 drives the motor 12 based on the motor drive signal (the actual current value I) from the motor drive signal generating unit 29. The assist torque is applied to the steering shaft 3 through driving of the motor 12.

The assist torque calculating unit 40 has a basic assist torque calculating unit 41, a target turning angle calculating unit 44, a turning angle feedback control unit 45, a turning angle calculating unit 43, an adder 46, a subtractor 47, and a road information control unit 50. Each control block in this assist torque calculating unit 40 is implemented by a computer program executed by the microcomputer 31.

The basic assist torque calculating unit 41 calculates a basic assist torque command value Tab based on the steering torque Th detected by the torque sensor 24 and the vehicle speed V detected by the vehicle speed sensor 26, and then outputs the calculation result to the subtractor 47. The basic assist torque calculating unit 41 increases the basic assist torque command value Tab as the steering torque Th becomes larger. The basic assist torque calculating unit 41 also decreases the basic assist torque command value Tab as the vehicle speed V becomes faster.

The subtractor 47 calculates a basic assist torque command value Tab* by subtracting from the basic assist torque command value Tab an RIF (road information) command value Trif* from the road information control unit 50, and then outputs the calculated basic assist torque command value Tab* to the target turning angle calculating unit 44 and the adder 46, respectively.

The target turning angle calculating unit 44 calculates a target turning angle $\theta p$ based on the steering torque Th and the basic assist torque command value Tab*, and then outputs the calculation result to the turning angle feedback control unit 45. The target turning angle $\theta p$ is an ideal tire turning angle (steering turning angle) depending on a total torque Tt obtained by summing the steering torque Th and the basic assist torque command value Tab*. This total torque Tt corresponds to input torque.

The turning angle calculating unit 43 calculates an actual turning angle $\theta ps$ based on the motor rotation angle $\theta m$ detected through the rotation angle sensor 7, and then outputs the calculation result to the turning angle feedback control unit 45 and the road information control unit 50, respectively.

The adder 46 calculates an assist torque command value Tas by adding an assist torque correction value $\Delta$Tab from the turning angle feedback control unit 45 to the basic assist torque command value Tab*, and then outputs the calculation result to the current command value calculating unit 28. The turning angle feedback control unit 45 executes feedback control so as for the actual turning angle $\theta ps$ to be the target turning angle $\theta p$ through adjustment to the magnitude of the assist torque correction value $\Delta$Tab. Consequently, the magnitude of the assist torque correction value $\Delta$Tab is adjusted so as for the actual turning angle $\theta ps$ to be the target turning angle $\theta p$ even when the rack-and-pinion mechanism 4 vibrates due to reverse input torque transmitted from the steerable wheel to the steering system, for example. Accordingly, vibration of the steering wheel 2 associated with road surface conditions can be suppressed. Thus, a more stable steering feeling can be obtained.

Figure 4:
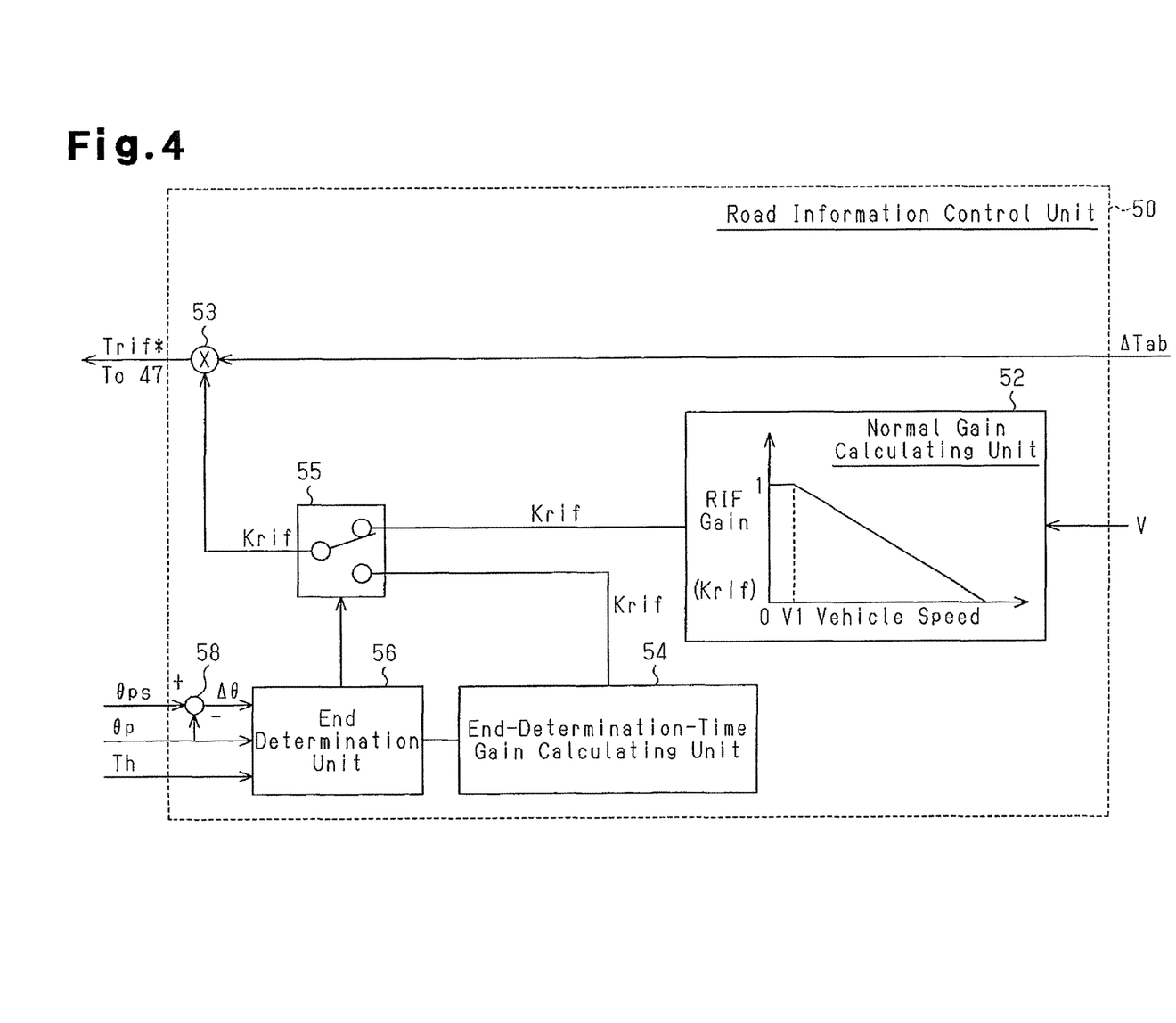
FIG. 4 is a block diagram showing a configuration of a road information control unit.

As shown in FIG. 4, the road information control unit 50 has a switching control unit 55, an end-determination-time gain calculating unit 54, an end determination unit 56, a normal-time gain calculating unit 52, a multiplier 53, and an adder 58.

The road information control unit 50 can freely control an RIF (road information) gain Krif between "0" and "1". The road information control unit 50 transmits reverse input torque according to the magnitude of the RIF gain Krif as road information to the steering wheel 2 through the output of the RIF command value Trif* to the subtractor 47. When the RIF gain Krif is "0" for example, the reverse input torque is completely removed and the road information is not provided to the steering wheel 2.

When the RIF gain Krif is "1", on the other hand, the RIF command value Trif* to be input to the subtractor 47 takes the same value as the assist torque correction value $\Delta$Tab, as shown in FIGS. 3 and 4. Thus, the RIF command value Trif* to be input to the subtractor 47 cancels the assist torque correction value $\Delta$Tab to be input to the adder 46. Thus, the control to make the actual turning angle $\theta ps$ be the target turning angle $\theta p$ by the turning angle feedback control unit 45 is virtually stopped when the RIF gain Krif is "1". Consequently, the reverse input torque is all provided to the steering wheel 2 as road information.

Specifically, the switching control unit 55 switches the connection status between the normal-time gain calculating unit 52 and the end-determination-time gain calculating unit 54, as shown in FIG. 4. The switching control unit 55 outputs to the multiplier 53 the RIF gain Krif from the connected normal-time gain calculating unit 52 or end-determination-time gain calculating unit 54. The multiplier 53 multiplies the assist torque correction value $\Delta$Tab and the RIF gain Krif, and then outputs the multiplied RIF command value Trif* to the subtractor 47.

The normal-time gain calculating unit 52 calculates the RIF gain Krif according to the vehicle speed V, and then outputs the calculated RIF gain Krif to the switching control unit 55. The normal-time gain calculating unit 52 sets the RIF gain Krif at "1" in an area where the vehicle speed is no more than the vehicle speed V1 and sets the RIF gain Krif to be smaller as the vehicle speed V is faster in an area where the vehicle speed exceeds the vehicle speed V1.

The adder 58 calculates an angle deviation $\Delta\theta$ obtained by subtracting the target turning angle $\theta p$ from the actual turning angle $\theta ps$, and then outputs the angle deviation $\Delta\theta$ to the end determination unit 56. Further, the target turning angle $\theta p$ and the steering torque Th are output to the end determination unit 56.

The end determination unit 56 determines that the end touching state has been reached when the target turning angle θp becomes an angle near the end and the angle deviation Δθ exceeds a threshold θth and then turns the end flag on. The end touching state means a state where an end portion of the rack shaft 5 touches against the rack housing.

Even if the steering torque Th is applied further in an end direction in the end touching state, the actual turning angle θps does not increase in response to the increase in the steering torque Th. Due to this, a difference between the target turning angle θp and the actual turning angle θps, that is, the angle deviation Δθ becomes large. The end direction corresponds to a direction opposite to a neutral position of the steering wheel 2. The threshold θth is set at the angle deviation Δθ which cannot be caused except in the end touching state.

The end determination unit 56 turns the end flag off when release conditions hold. The release conditions are, for example, that the actual turning angle θps is not an angle near the end, and that the angle deviation Δθ, a time rate of change of the angle deviation Δθ, and the steering torque Th are no more than predetermined values.

The end-determination-time gain calculating unit 54 monitors an on-off state of the end flag through the end determination unit 56. Then, the end-determination-time gain calculating unit 54 calculates the RIF gain Krif depending on the on-off state of the end flag and outputs the calculated RIF gain Krif to the switching control unit 55.

Figure 5:
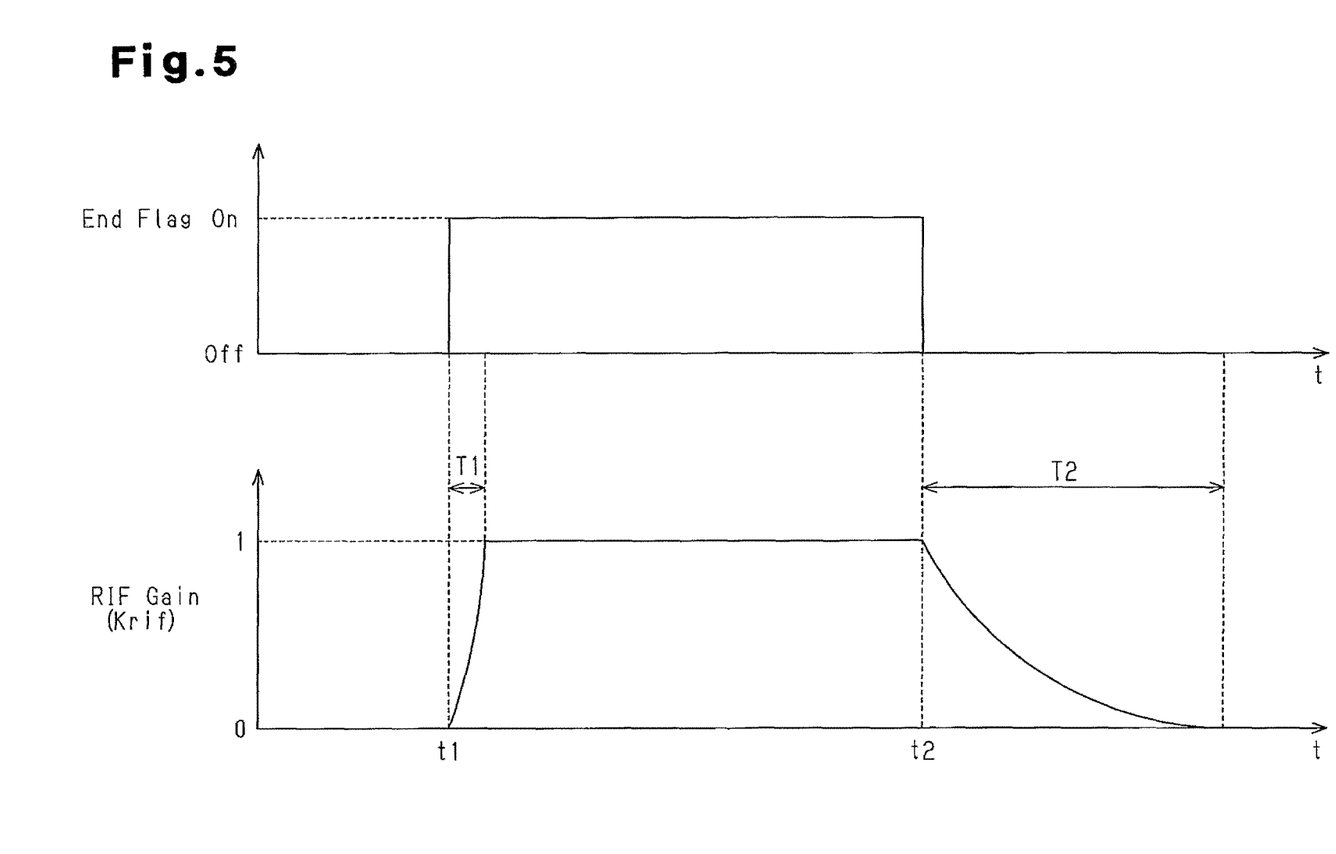
FIG. 5 is a graph showing changes of an end flag and a road information gain.

Specifically, the end-determination-time gain calculating unit 54 rapidly increases the RIF gain Krif from "0" to "1" when the end flag is switched from the off state to the on state at time t1 as shown in FIG. 5. It takes a fixed time T1 until the RIF gain Krif becomes "1" from "0".

The end-determination-time gain calculating unit 54 then gradually decreases the RIF gain Krif from "1" to "0" when the end flag is switched from the on state to the off state at time t2. It takes a fixed time T2 longer than the above fixed time T1 until the RIF gain Krif becomes "0" from "1". That is, an inclination at the time of turning the RIF gain Krif "0" from "1" is set smaller than an inclination at the time of turning the RIF gain Krif "1" from "0".

The fixed time T2 is set for the purpose of suppressing an uncomfortable feeling in operation of the steering wheel 2 associated with a rapid start of the control to make the actual turning angle θps be the target turning angle θp in a state of the angle deviation Δθ being large. The uncomfortable feeling is caused by the application of the assist torque in the end direction when the steering wheel 2 is returned toward the neutral position from the end touching state.

The end determination unit 56 brings the switching control unit 55 into a state connected to the normal-time gain calculating unit 52 when the end flag is off. In this state, the RIF gain Krif from the normal-time gain calculating unit 52 is output to the multiplier 53. The end determination unit 56 brings the switching control unit 55 into a state connected to the end-determination-time gain calculating unit 54 when the end flag is on.

Figure 6:
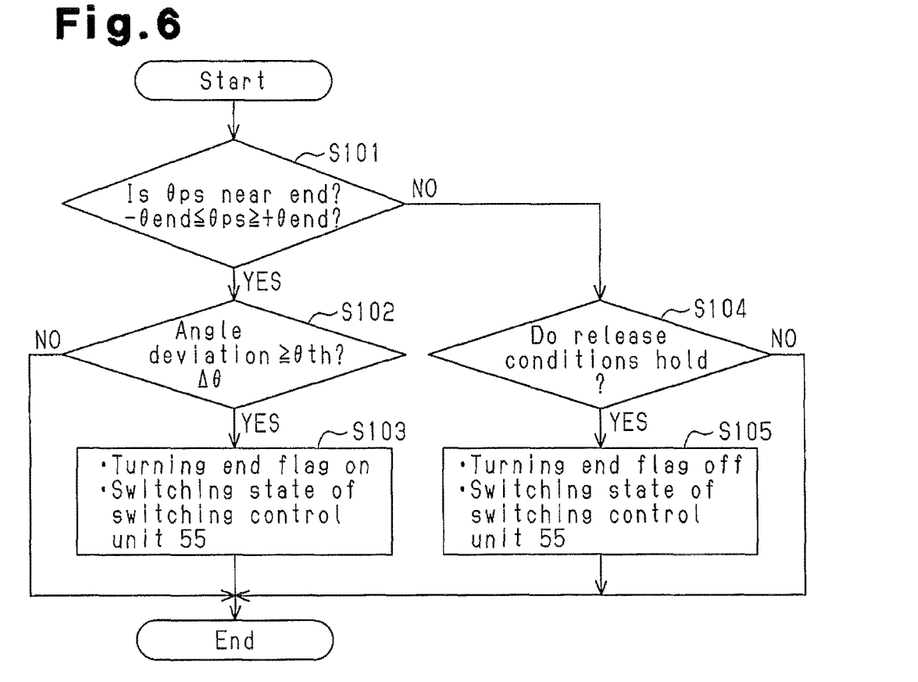
FIG. 6 is a flow chart showing procedures of an end determination unit.

Next, procedures of the end determination unit 56 will be described with reference to the flow chart of FIG. 6.

The end determination unit 56 determines whether the actual turning angle θps becomes an angle near the end (S101). In the step S101, the end determination unit 56 determines whether or not "−θend≤θps≥+θend" holds. In this case, a positive near end angle is set to +θend, and a negative near end angle is set to −θend.

When determining that the actual turning angle θps is the angle near the end (YES in S101), the end determination unit 56 determines whether the angle deviation Δθ exceeds the threshold θth (S102). When determining that the angle deviation Δθ exceeds the threshold θth (YES in S102), the end determination unit 56 turns the end flag on and brings the switching control unit 55 into the state connected to the end-determination-time gain calculating unit 54 (S103). Now, the end determination unit 56 terminates the processing. When determining that the angle deviation Δθ is less than the threshold θth (NO in S102), the end determination unit 56 terminates the processing without switching the end flag.

When determining that the actual turning angle θps is not the angle near the end (NO in S101), on the other hand, the end determination unit 56 determines whether the foregoing release conditions hold (S104). When determining that the release conditions hold (YES in S104), the end determination unit 56 turns the end flag off and brings the switching control unit 55 into the state connected to the normal-time gain calculating unit 52 (S105). Now, the end determination unit 56 terminates the processing.

Figure 7:
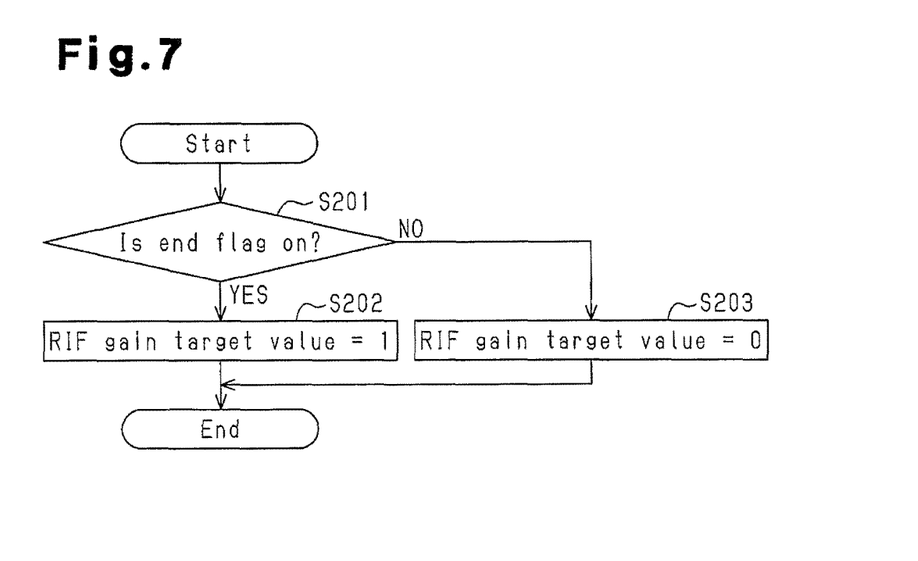
FIG. 7 is a flow chart showing procedures of an end-determination-time gain calculating unit.

Subsequently, procedures of the end-determination-time gain calculating unit 54 will be described with reference to the flow chart in FIG. 7.

First, the end-determination-time gain calculating unit 54 determines whether the end flag is on through the end determination unit 56 (S201). When determining that the end flag is on (YES in S201), the end-determination-time gain calculating unit 54 sets the target value of the RIF gain Krif at "1" (S202). As a result, the RIF gain Krif is controlled at "1" as shown in FIG. 5.

When determining that the end flag is off (NO in S201), on the other hand, the end-determination-time gain calculating unit 54 sets the target value of the RIF gain Krif at "0" (S203). As a result, the RIF gain Krif is controlled at "0" as shown in FIG. 5.

It is noted that the basic assist torque command value Tab* corresponds to the first command value, and the assist torque correction value ΔTab corresponds to the second command value, and the RIF command value Trif* corresponds to the third command value.

Further, the basic assist torque calculating unit 41 corresponds to the first control device. The turning angle feedback control unit 45 corresponds to the second control device. The end determination unit 56 corresponds to the end touch determination device. Further, the current command value calculating unit 28, the motor drive signal generating unit 29, the inverter circuit 30, and the motor 12 correspond to the steering force provider.

According to the embodiment described above, the following advantageous effects can be performed.

(1) When the angle deviation Δθ exceeds the threshold, the end determination unit 56 determines that the end touching state has been reached. This angle deviation Δθ exceeds the threshold before a large axial force is generated in the steering shaft 3, in particular, the intermediate shaft. In the conventional configuration where the determination to be in the end touching state is made through the torque generated in the steering shaft 3 for example, the threshold needs to be set to be a torque that cannot be caused under normal circumstances except for the end touching state. As a result, the threshold naturally becomes large and the determination to be in the end touching state is delayed. In this respect, the actual turning angle θps is controlled at the target turning angle θp in the foregoing configuration, so that a large angle deviation Δθ is not caused under normal circumstances. Accordingly, it becomes possible to make the threshold θth according to the end touch determination small and furthermore, to make the determination to be in the end touching state more quickly.

(2) When the steering apparatus is determined to be in the end touching state, the control to make the actual turning angle θps be the target turning angle θp by the turning angle feedback control unit 45 is virtually stopped. Therefore, the application of the assist torque in the end direction from the end touching state can be suppressed. As a result, large torque can be suppressed from being applied to the steering shaft 3.

(3) The road information control unit 50 adjusts the degree of transmission of the reverse input torque from the wheels to the steering shaft 3 by changing the RIF gain Krif. As a result, road information is transmitted to the user according to the vehicle speed V. Further, turning this RIF gain Krif "1" allows the RIF command value Trif* to cancel the assist torque correction value ΔTab. At this moment, the control to make the actual turning angle θps be the target turning angle θp by the turning angle feedback control unit 45 is virtually stopped.

(4) When the release conditions for the end touching state hold, the RIF gain Krif is gradually changed from "1" to "0" as compared with when the steering apparatus is determined to be in the end touching state. For example, when the RIF gain Krif is rapidly switched from "1" to "0", the control to make the actual turning angle θps be the target turning angle θp is suddenly started. In this case, when the steering wheel 2 is returned from the end touching state, the assist torque is applied in the end direction in order to cancel the angle deviation Δθ. As a result, an uncomfortable feeling in operation of the steering wheel 2 may be caused. In this respect, this uncomfortable feeling can be suppressed by changing the RIF gain Krif gradually in the foregoing configuration.

The foregoing embodiment may be modified as follows.

The target turning angle calculating unit 44 calculates the target turning angle θp based on the total torque Tt as input torque in the foregoing embodiment. However, the target turning angle θp may be calculated based on only the steering torque Th or only the basic assist torque command value Tab as the input torque.

When the steering apparatus is determined to be in the end touching state through the end determination unit 56 in the foregoing embodiment, the RIF gain Krif is controlled at "1". However, when it is determined to be in the end touching state through the end determination unit 56, the current command value Ic may be reduced. As a result, heat generation in the motor 12 associated with an overcurrent in the end touching state can be suppressed.

The control to make the actual turning angle θps be the target turning angle θp is virtually stopped at the time of being brought into the end touching state in the foregoing embodiment. However, the operation of the turning angle feedback control unit 45 may be stopped actually. In this case, the output of the RIF command value Trif* from the road information control unit 50 needs to be stopped.

The invention claimed is:

1. An electric power steering apparatus comprising:
a basic assist torque calculating unit configured to generate a basic assist torque command value for providing assist torque to a steering system according to steering torque applied to a steering shaft through an operation of a steering wheel by a driver;
a target turning angle calculating unit configured to determine a target turning angle depending on input torque that is at least either the basic assist torque command value or the steering torque;
a turning angle feedback control unit configured to generate an assist torque correction value for controlling an actual turning angle of a vehicle to be the target turning angle, wherein the turning angle feedback control unit executes feedback control so as for the actual turning angle to be the target turning angle through adjustment to a magnitude of the assist torque correction value;
a steering force provider configured to provide assist torque to the steering system based on a value obtained by adding the assist torque correction value to the basic assist torque command value; and
an end touch determination device configured to determine that the steering apparatus is in an end touching state where an end portion of a rack shaft of the steering system touches against an end by the operation of the steering wheel and a steerable wheel reaches a maximum angle position or a minimum angle position in a range of movement of the steerable wheel, when an angle deviation between the actual turning angle and the target turning angle exceeds a threshold.

2. The electric power steering apparatus according to claim 1, wherein the end touch determination device determines whether the actual turning angle is equal to or larger than a negative near end angle and is equal to or less than a positive near end angle before it is determined whether the angle deviation is equal to or larger than the threshold.

3. The electric power steering apparatus according to claim 1, wherein the control to make the actual turning angle be the target turning angle by the turning angle feedback control unit is stopped when it is determined that the steering apparatus is in the end touching state through the end touch determination device.

4. The electric power steering apparatus according to claim 3, further comprising a road information control unit generating a road information command value for transmitting reverse input torque from wheels to the steering system at a rate corresponding to a road information gain,
wherein the steering force provider provides assist torque to the steering system based on the basic assist torque command value, the assist torque correction value and the road information command value, and
the road information control unit virtually stops the control to make the actual turning angle be the target turning angle by the turning angle feedback control unit by generating the road information command value so as to cancel the assist torque correction value through adjustment of the road information gain.

5. The electric power steering apparatus according to claim 4, wherein the road information control unit controls the road information gain between "1" of entirely transmitting the reverse input torque from wheels to the steering system and "0" of entirely cutting off the reverse input torque from wheels to the steering system, and
an inclination at the time of turning the road information gain from "1" to "0" when it is determined that the end touching state is released is set smaller than an inclination at the time of turning the road information gain from "0" to "1" when it is determined that the steering apparatus is in the end touching state.

* * * * *